United States Patent [19]

Kumpf et al.

[11] Patent Number: 5,221,727
[45] Date of Patent: Jun. 22, 1993

[54] AROMATIC POLYETHERS CONTAINING ESTER GROUPS

[75] Inventors: Robert Kumpf, Pittsburgh, Pa.; Rolf Wehrmann; Harald Pielartzik, both of Krefeld, Fed. Rep. of Germany; Dittmar Nerger, Pittsburgh, Pa.

[73] Assignee: Bayer Atkiengesellschaft, Leverkusen, Fed. Rep. of Germany

[21] Appl. No.: 659,626

[22] Filed: Feb. 25, 1991

[30] Foreign Application Priority Data

Mar. 7, 1990 [DE] Fed. Rep. of Germany ....... 4007061

[51] Int. Cl.$^5$ .............. C08G 8/02; C08G 75/00; C08C 65/40
[52] U.S. Cl. .................... 528/128; 528/125; 528/126; 528/171; 528/172; 528/173; 528/174; 528/175; 528/212; 528/214; 528/215; 528/216; 528/218; 528/219
[58] Field of Search ............... 528/125, 126, 128, 174, 528/175, 173, 172, 171, 212, 214, 215, 216, 218, 219

[56] References Cited

U.S. PATENT DOCUMENTS

| | | | |
|---|---|---|---|
| 4,517,354 | 5/1985 | D'Alelio | 528/172 |
| 4,705,843 | 11/1987 | Stammann et al. | 528/212 |
| 4,999,414 | 3/1991 | Genz | 528/125 |
| 5,047,496 | 9/1991 | Eckel et al. | 528/171 |

FOREIGN PATENT DOCUMENTS

| | | | |
|---|---|---|---|
| 113112 | 7/1984 | European Pat. Off. | 528/125 |
| 0347669 | 12/1989 | European Pat. Off. | |
| 0354377 | 2/1990 | European Pat. Off. | |

OTHER PUBLICATIONS

Price et al, "The Synthesis of Two Dihydroxyterphenyls"; vol. 66, pp. 632–633.
CA 115(16): 1599526.
CA 111(26): 233920a.
CA 108(16): 132611h.
CA 107(22): 199170m.
CA 107(22): 199168s.
CA 107(18): 154979r.
CA 91(16): 124023h.
Polymer Science U.S.S.R., vol. 14, No. 10 (1973); S. V. Vinogradova et al., "Aromatic Polyethers of the 'Cardic' Type", pp. 2962–2970.

Primary Examiner—John Kight, III
Assistant Examiner—P. Hampton-Hightower
Attorney, Agent, or Firm—Connolly & Hutz

[57] ABSTRACT

The new aromatic polyethers containing ester groups, which are distinguished by high dimensional stability, may be used for the production of all kinds of moulded products as well as for the preparation of block copolymers of aromatic polyether segments and segments of other thermoplastic polymers.

12 Claims, No Drawings

AROMATIC POLYETHERS CONTAINING ESTER GROUPS

This invention relates to aromatic polyethers containing ester groups, to a process for the preparation of the aromatic polyethers and to the use of the aromatic polyethers for the production of moulded products of all types and for the preparation of block copolymers of aromatic polyether segments and segments of other thermoplastic polymers.

It is known that aromatic polyethers, e.g. polyphenylene oxide, polyether sulphones, polyether ketones and polyether amides, are polymers with high dimensional stability in the heat. They have little tendency to oxidation, are difficultly flammable and have excellent mechanical properties. Partially crystalline polyarylene ethers, e.g. polyether ether ketones, in addition have a high resistance to chemicals and solvents. One disadvantage of aromatic polyethers, however, is that owing to their insufficient functionality, they are not suitable for certain technical applications, e.g. as membrane materials for special separating problems. In addition, chemical modification such as the preparation of block copolymers is hardly possible owing to the absence of functional groups such as ester groups.

The present invention relates to aromatic polyethers containing ester groups in accordance with formula (I)

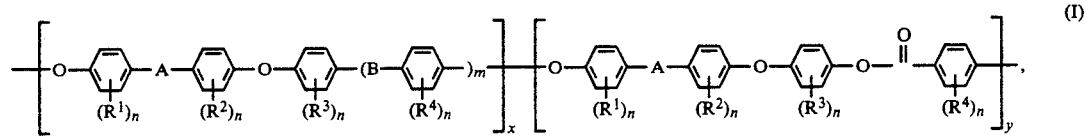

wherein
$R^1$ to $R^4$ may be identical or different and stand for halogen, preferably fluorine, chlorine or bromine, hydrogen, $C_1$–$C_4$-alkyl, preferably methyl or ethyl, $C_6$–$C_{12}$-aryl, preferably phenyl or biphenyl, or $C_7$–$C_{12}$-aralkyl, preferably methylphenyl or ethylphenyl, A stands for $SO_2$, CO, SO or a group corresponding to the following formula

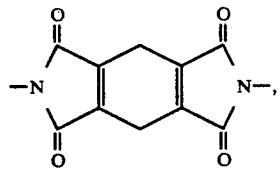

preferably for CO or $SO_2$,

B denotes a chemical bond, CO, O, S, $SO_2$,

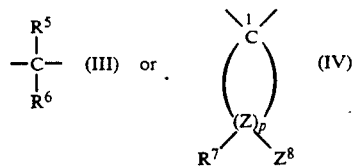

wherein
$R^5$ and $R^6$ may be identical or different and stand for halogen, preferably fluorine, chlorine or bromine, hydrogen, $C_1$–$C_4$-alkyl, preferably methyl or ethyl, or $C_5$–$C_{12}$-cycloalkyl optionally containing one or more alkyl substituents, such as cyclopentyl, cyclohexyl, methylcyclopentyl or methylcyclohexyl, p stands for an integer with a value from 4 to 7, preferably 4 or 5, $R^7$ and $R^8$, which may be chosen individually for each Z, denote, independently of one another, hydrogen or $C_1$–$C_6$-alkyl, preferably H or methyl, and Z denotes carbon, under the condition that on at least one Z atom, the groups $R^7$ and $R^8$ are both alkyl groups, n stands for 0 or an integer from 1 to 4, preferably 0, 1 or 2, m stands for 0 or an integer from 1 to 3, preferably 0, 1 or 2, most preferably 0 or 1, and x and y are in proportions to one another ranging from 99.5 : 0.5 parts by weight to 50 : 50 parts by weight, preferably from 99.5 : 0.5 parts by weight to 70 : 30 parts by weight, in particular from 99.5 : 0.5 parts by weight to 80 : 20 parts by weight, most preferably from 99.5 : 0.5 to 85 : 15 parts by weight, per total quantity of polymer.

In formula (IV), $R^7$ and $R^8$ are preferably both alkyl on one or two Z atoms, in particular on only one Z atom. The Z atoms in the α-position to the diphenyl-substituted carbon atom (C-1) are preferably not dialkyl-substituted but alkyl disubstitution is preferred in the-β-position to C-1.

Among the aromatic polyethers containing ester groups, those corresponding to the following formulae are preferred:

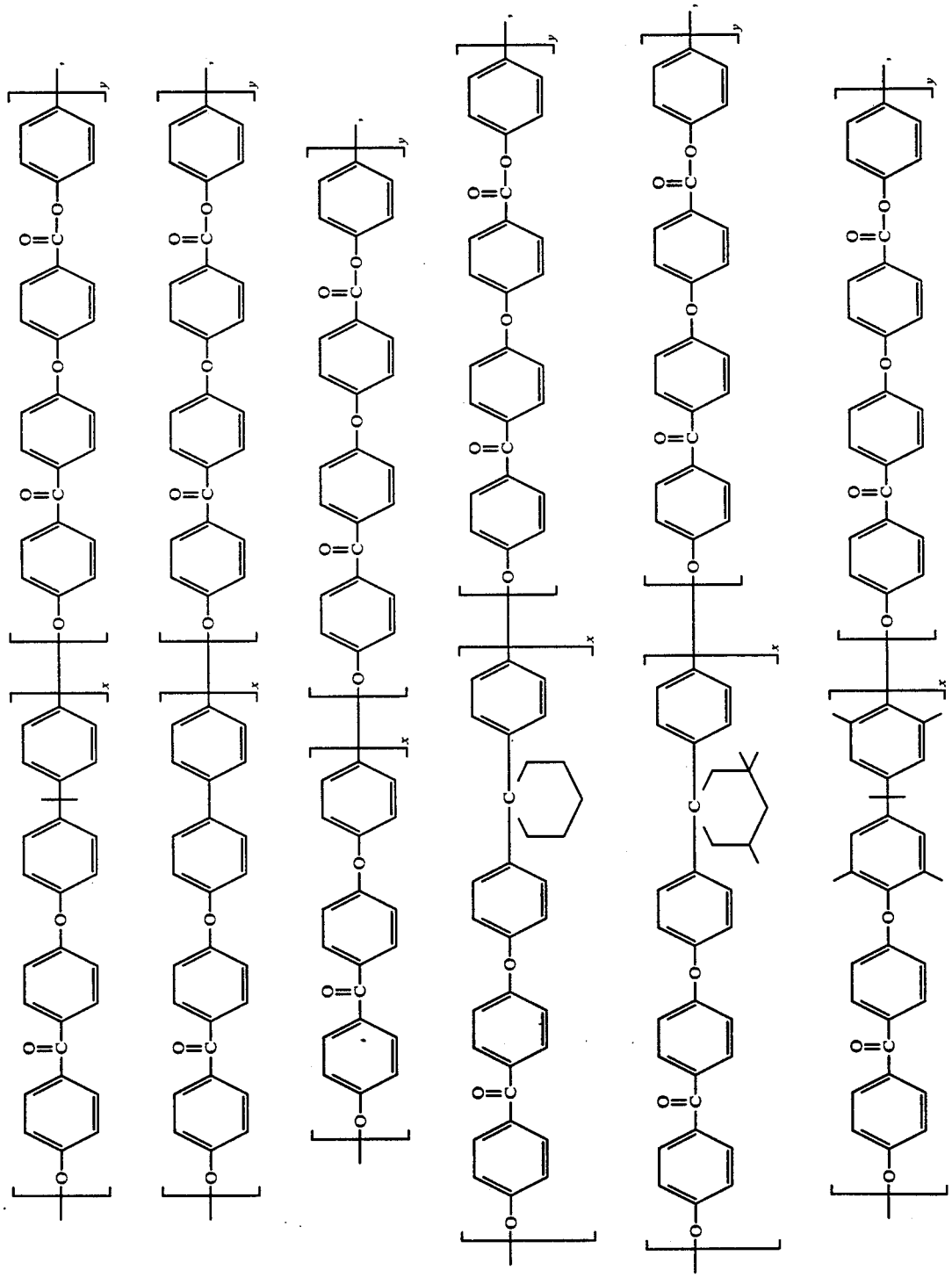

-continued
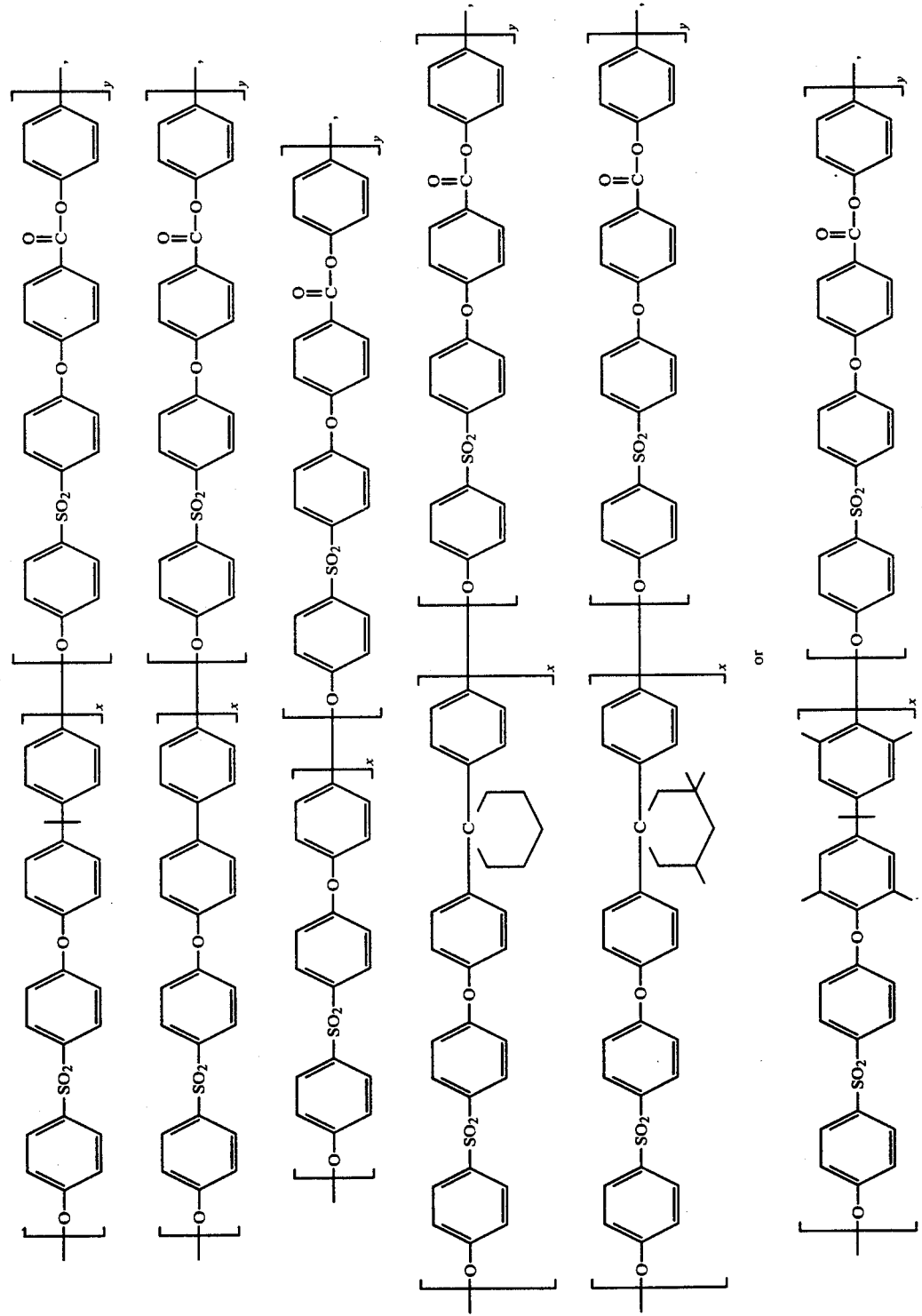

wherein x and y have the meanings indicated above.

Among the new aromatic polyethers containing ester groups, those corresponding to the following formulae should be particularly noted:

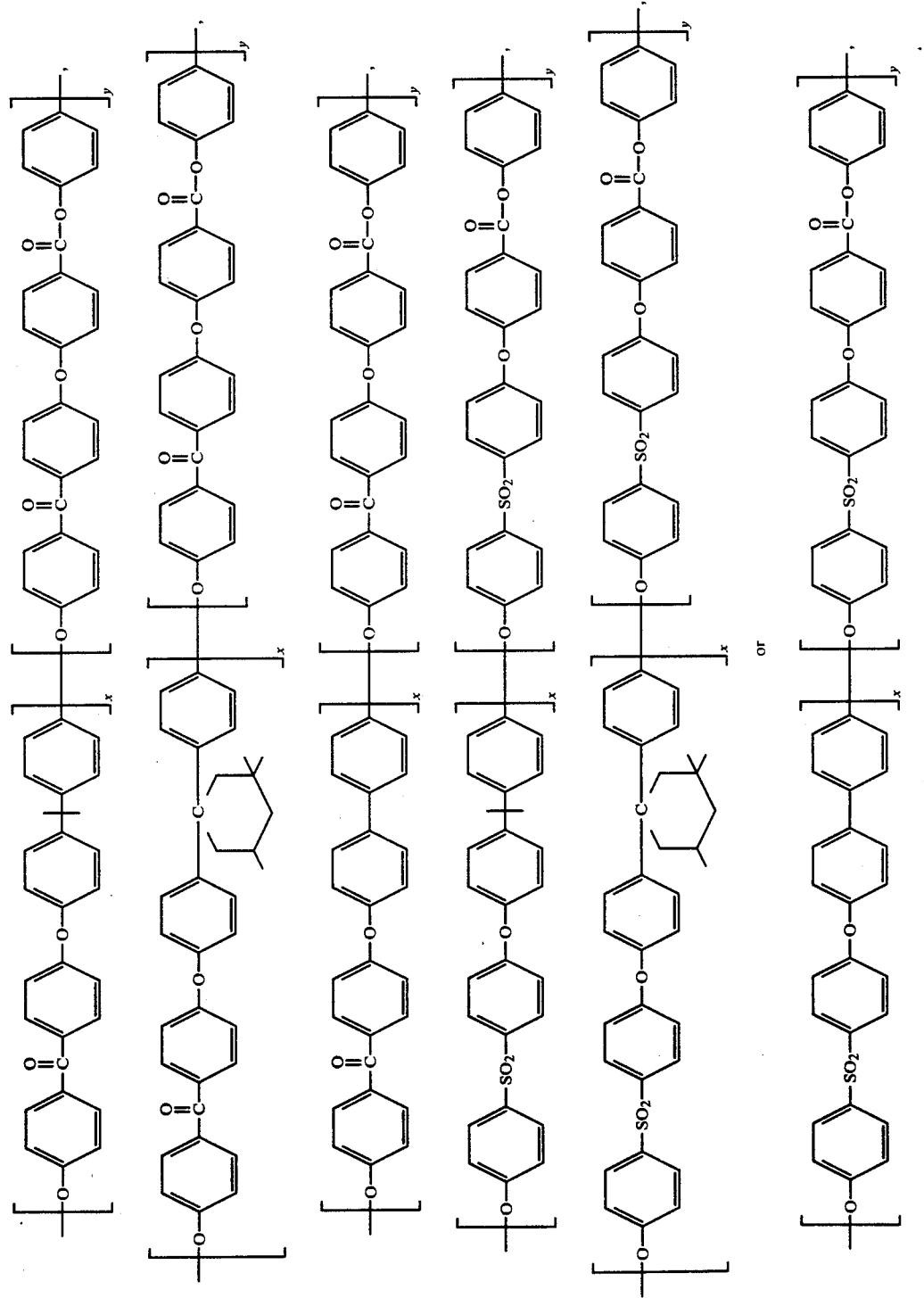

wherein x and y have the meanings indicated above.

The invention further relates to a process for the preparation of the new aromatic polyethers containing ester groups as represented by formula (I)

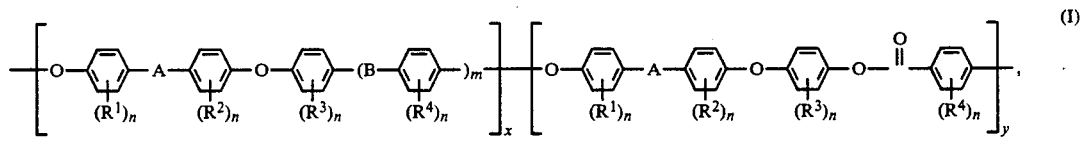

wherein
- $R^1$ to $R^4$ may be identical or different and stand for halogen, preferably fluorine, chlorine or bromine, hydrogen, $C_1$-$C_4$-alkyl, preferably methyl or ethyl, $C_6$-$C_{12}$-aryl, preferably phenyl or biphenyl, or $C_7$-$C_{12}$-aralkyl, preferably methylphenyl or ethylphenyl,
- A stands for $SO_2$, CO, SO or a group corresponding to the following formula

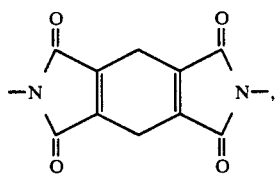

preferably for CO or $SO_2$,
B denotes a chemical bond, CO, O, S, $SO_2$,

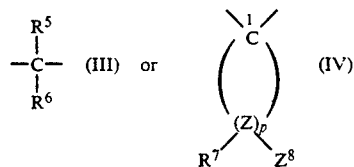

wherein
- $R^5$ and $R^6$ may be identical or different and stand for halogen, preferably fluorine, chlorine or bromine, hydrogen, $C_1$-$C_4$-alkyl, preferably methyl or ethyl, or $C_5$-$C_{12}$-cycloalkyl optionally containing one or more alkyl substituents, e.g. cyclopentyl, cyclohexyl, methylcyclopentyl or methylcyclohexyl,
- p stands for an integer with a value from 4 to 7, preferably 4 or 5,
- $R^7$ and $R^8$ may chosen individually for each Z and denote, independently of one another, hydrogen or $C_1$-$C_6$-alkyl, preferably H or methyl, and
- Z denotes carbon
- under the condition that on at least one Z atom, the groups R7 and R8 are both alkyl,
- n denotes 0 or an integer with a value from 1 to 4, preferably 0, 1 or 2,
- m denotes 0 or an integer from 1 to 3, preferably 0, 1 or 2, most preferably 0 or 1, and
- x and y are in proportions ranging from 99.5 : 0.5 parts by weight to 50 : 50 parts by weight, preferably from 99.5 : 0.5 parts by weight to 70 : 30 parts by weight, in particular from 99.5 : 0.5 parts by weight to 80 : 20 parts by weight, most preferably from 99.5 : 0.5 to 85 : 15 parts by weight, per total quantity of polymer, characterised in that aromatic dihalides corresponding to formula (V)

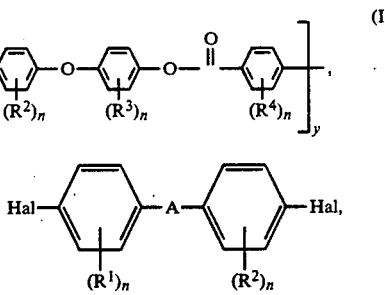

wherein
- $R^1$, $R^2$, A and n have the meanings indicated above and
- Hal stands for fluorine, chlorine or bromine, preferably fluorine or chlorine, are reacted with aromatic bisphenols corresponding to the general formula (VI)

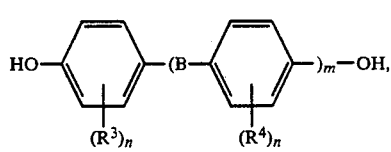

wherein
- $R^3$, $R^4$, B, m and n have the meanings indicated above and with aromatic ester bisphenols corresponding to the general formula (VII)

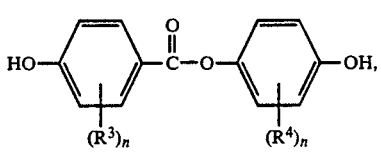

wherein
- $R^3$, $R^4$ and n have the meanings indicated above, in the presence of from 1 to 1.3 equivalents of basic catalysts, based on the dihydroxy compounds corresponding to the general formulae (VI) and (VII), and in the presence of dipolar, aprotic solvents corresponding to formulae (VIII) and/or (IX)

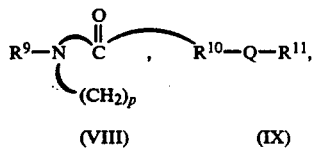

wherein
- $R^9$, $R^{10}$ and $R^{11}$ may be identical or different and stand for $C_1$-$C_{20}$-alkyl, $C_5$-$C_7$-cycloalkyl, preferably methyl, ethyl or propyl, and $C_6$-$C_{20}$-aryl, preferably phenyl,
- Q denotes a sulphoxide or sulphone group and
- p stands for the numbers 3, 4 or 5, preferably 3 or 5,
the bisphenols of formulae (VI) and (VII) being put into the process in ratios of from 99.5 : 0.5 to 50 : 50 parts by weight, preferably from 99.5 : 0.5 to 70 : 30 parts by weight, in particular from 99.5 : 0.5 to 80 : 20 parts by weight, most preferably from 99.5 : 0.5 to 85 : 15 parts by weight.

The new aromatic polyethers containing ester groups have average molecular weights (weight average determined by gel permeation chromatography (GPC) using polystyrene as standard) of from 560 to 300,000, in particular from 1000 to 200,000, especially from 2000 to 100,000.

The reaction of the aromatic dihalides with the aromatic bisphenols corresponding to the above formulae is generally carried out in the presence of from 0.5 to 50 parts by weight, preferably from 2 to 20 parts by weight, of polar solvents corresponding to the given formulae, based on the total weight of the polyether-forming components.

It has been found in practice that the aromatic polyethers may be prepared at temperatures of about 130 to 320° C., preferably at 145° to 280° C., and at pressures from 0.8 to 10 bar, preferably from 1 to 3 bar, in particular at atmospheric ambient pressure.

The reaction time is generally from 1 to 50 hours, preferably from 2 to 20 hours.

The following are examples of suitable aromatic dihalogen compounds of formula (V): 4,4'-Dichlorodiphenylsulphone, 4,4'-difluorodiphenylsulphone, 4,4'-difluorobenzophenone and/or 4,4'-dichlorobenzophenone.

The following are examples of suitable diphenols corresponding to formula (VI):
Hydroquinone,
Methylhydroquinone,
phenylhydroquinone,
resorcinol,
dihydroxydiphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphones,
bis-(hydroxyphenyl)-sulphoxides,
$\alpha,\alpha'$-bis-(hydroxyphenyl)-diisopropylbenzenes
and the corresponding compounds which are alkylated or halogenated in the nucleus.

These and other suitable "other" diphenols (III) are described, for example, in U.S. Pat. Nos. 3 028 365, 2 999 835, 3 148 172, 2 069 560, 3 275 601, 2 991 273, 3 271 367, 3 062 781, 2 970 131, 2 069 573 and 2 999 846, in German Offenlegungsschriften Nos. 1 570 703, 2 063 050, 2 063 052 and 2 211 095, in German Patent Application P 38 32 396.6 and French Patent Specification 1 561 518, in JP-OS 62039/86, 62040/86 and 105550/86 and in the monograph, "H. Schnell, Chemistry and Physics of Polycarbonates, Interscience Publishers, New York, 1964".

The following are examples of preferred other diphenols:
4,4'-Dihydroxydiphenyl,
2,2-bis-(4-hydroxyphenyl)-propane,
2,4-bis-(4-hydroxyphenyl)-2-methylbutane,
1,1-bis-(4-hydroxyphenyl)-cyclohexane,
$\alpha,\alpha'$-bis-(4-hydroxyphenyl)-p-diisopropylbenzene,
2,2-bis-(3-methyl-4-hydroxyphenyl)-propane,
2,2-bis-(3-chloro-4-hydroxyphenyl)-propane,
bis-(3,5-dimethyl-4-hydroxyphenyl)-methane,
2,2-bis-(3,5-dimethyl-4-hydroxyphenyl)-propane,
bis-(3,5-dimethyl-4-hydroxyphenyl)-sulphone,
2,4-bis-(3,5-dimethyl-4-hydroxyphenyl)-2-methylbutane,
1,1-bis-(3,5-dimethyl-4-hydroxyphenyl)-cyclohexane,
$\alpha,\alpha'$-bis-(3,5-dimethyl-4-hydroxyphenyl)-p-diisopropyl benzene,
2,2-bis-(3,5-dichloro-4-hydroxyphenyl)-propane,
2,2-bis-(3,5-dibromo-4-hydroxyphenyl)-propane,
2,2-bis-(4-hydroxyphenyl)-propane,
2,2-bis-(3,5-dimethyl-4-hydroxyphenyl)-propane,
2,2-bis-(3,5-dichloro-4-hydroxyphenyl)-propane,
2,2-bis-(3,5-dibromo-4-hydroxyphenyl)-propane,
1,1-bis-(4-hydroxyphenyl)-cyclohexane,
4,4'-dihydroxy-diphenylsulphone,
1,6-, 1,7-, 2,6-, and 2,7-naphthaindole,
4,4'-dihydroxy-diphenylsulphone and
4,4'-dihydroxy-benzophenone.

The following are further bisphenol components suitable for the preparation of the aromatic polyethers containing ester groups: 3,3,5-Trimethyl-1,1-bis-(4-hydroxyphenyl)-cyclohexane, 3,3,5-trimethyl-1,1-bis-(4-hydroxy-3,5-dimethylphenyl)-cyclohexane, 3,3,5,5-tetramethyl-1,1-bis-(4-hydroxyphenyl)-cyclohexane, 3,3,5,5-tetramethyl-1,1-bis-(4-hydroxy-2,5-dimethylphenyl)cyclohexane, 3,3,5-trimethyl-1,1-bis-(4-hydroxyphenyl)cyclopentane and 3,3,5-trimethyl-1,1-bis-(4-hydroxy-3,5-dimethylphenyl)-cyclopentane.

N-Methylpyrrolidone and N-methylcaprolactam are examples of compounds which may be used, separately or together, as dipolar, aprotic solvents corresponding to formula (VIII).

Dimethylsulphoxide, diphenylsulphone and/or sulpholan may be used as solvents corresponding to formula (IX).

Examples of suitable basic catalysts include alkali metal and alkaline earth metal salts such as sodium hydroxide, potassium hydroxide, sodium methanolate, potassium carbonate and potassium bicarbonate.

The reaction mixture may be dehydrated azeotropically before the reaction according to the invention (condensation) is carried out. This procedure has certain advantages. Conventional entraining agents such as toluene, mesitylene, chlorobenzene, dichlorobenzene and/or other known entraining agents are added to the reaction mixture for dehydration. The reaction is preferably carried out in an inert gas atmosphere, for example in the presence of nitrogen and/or argon. The reaction temperature is gradually raised as condensation progresses, preferably to temperatures in the region of 145° to 280° C., and the water and entraining agent added are removed from the reaction mixture at the same time. A gradual rise in viscosity is observed.

The polymer is then precipitated from the reaction mixture by a conventional precipitation reaction, e.g. by the addition of alcohols or alcohol/water mixtures, e.g. the addition of methanol, ethanol or isopropanol.

The reaction mixture may be diluted, for example with the polar reaction solvent or some other solvent for the polyether, especially when the solutions are very highly viscous, and may then be filtered. Isolation of the polymer may be carried out by the usual methods.

The aromatic polyethers according to the invention may be used for the production of moulded articles of all types. These may be produced in known manner, for example by extrusion, injection moulding, sintering or pressure moulding. The aromatic polyethers containing ester groups may be used wherever high dimensional stability is required, e.g. in electrotechnology and electronics, the construction of vehicles, in air and space flight, for sports equipment and for functional parts and utensils for microwave cookers. They may also be used for the production of sterilizable medical equipment, parts of coffee machines, egg boilers, hot water tanks, hot water pipes and pumps and hair driers.

Conventional additives such as plasticizers, mould release agents, stabilizers such as UV absorbents or anti-oxidants, auxiliary agents for promoting intumescence in the event of fire (flame-protective agents), reinforcing fibres such as glass fibres, carbon fibres or aramide fibres, fillers, inorganic and organic pigments, ceramic raw materials and carbon black may be added to the polyethers according to the invention. The quantities of additives to be used may easily be determined by preliminary tests and depend inter alia on the particular purpose for which the moulded product is to be used. Quantities of up to 80% by weight are commonly used, preferably up to 60 and most preferably up to 50% by weight, based on the total quantity of polymer. The additives are preferably added to the polyethers according to the invention before the latter are processed.

The ethers according to the invention may also be used for the preparation of block copolymers consisting of aromatic polyether segments and other segments of thermoplastic polymers.

Examples of such block copolymer systems include segmented block copolymers based on aromatic polyethers according to the invention and (co)polyesters, (co)polycarbonates, (co)polyamides and (co)polyester amides. The polyesters, polycarbonates, polyamides and polyester amides mentioned here are described, for example, in Encyclopedia of Polymer Science and Engineering, 2nd Edition, Wiley Interscience, John Wiley and Sons, New York.

Block copolymers of aromatic polyether segments and liquid crystalline polyester segments are of particular interest in this context.

The block copolymers described above may be prepared by, for example, reaction of the aromatic polyethers containing esters groups corresponding to formula (I) with the required thermoplastic polymers mentioned above as starting materials. The processes which may be employed for the preparation of the segmented block copolymers include, for example, solvent-free condensation and condensation in homogeneous solution.

Another possible method of preparation is the solvent-free transesterification of high molecular weight thermoplasts of the type mentioned above with the ester group-containing aromatic polyethers according to the invention in an extruder. Processes of this type have been described inter alia in Encyclopedia of Polymer Science and Engineering, 2nd Edition, Wiley Interscience, John Wiley and Sons, New York.

EXAMPLES

EXAMPLE 1

Polyether 1-3

Preparation of an aromatic polyether containing ester groups, Polyether 1

100 g (458.3 mmol) of 4,4'-difluorobenzophenone, 99.65 g (436.5 mmol) of bisphenol A (BPA), 5.02 g (21.8 mmol) of 4-hydroxybenzoic acid-4'-hydroxyphenylester (EBP) (molar ratio 20:1/BPA:EBP) and 69 g of anhydrous $K_2CO_3$ in a mixture of 500 ml of anhydrous N-methylcaprolactam (NMC) and 200 ml of anhydrous toluene are introduced into a 2 l three-necked flask equipped with motorized stirrer, internal thermometer and water separator. The solution is dehydrated overnight at about 155° C. Toluene and any residues of water still present are then removed stepwise so that the reaction temperatures rises to 180° C. Stirring is continued at this temperature for 5 hours before the temperature is raised to 185-190° C. and maintained at that level for 2 hours. The product is precipitated by pouring the reaction solution into 5 l of methanol/water (1:1). The solid is separated by suction filtration, taken up with methylene chloride, washed with dilute HCl until neutral, precipitated in methanol and dried in a water jet vacuum at 80° C.:

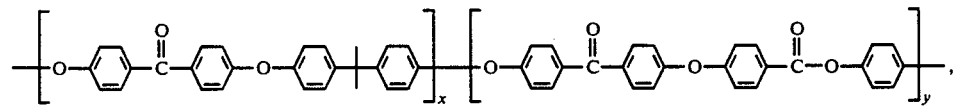

The ratios of x and y in the above formula depend on the quantities of starting compounds used.

Molecular weight (GPC): Mw=21,700

IR: 1730 cm$^{-1}$ (Ester band; band of monomeric ester bisphenol at 1690 cm−1), 1650 cm$^{-1}$ (carbonyl band of benzophenone unit), Tg (DSC): 155° C.

Polyethers 2 and 3 were prepared in analogous manner:

| | Molar ratio of BPA/EBP put into the process: | Mw (GPC) |
|---|---|---|
| Polyether 2 | 10:1 | 18,900 |
| Polyether 3 | 15:1 | 30,700 |

EXAMPLE 2

Polyether 4

12.7 g (50 mmol) of difluorodiphenylsulphone, 4.65 g (25 mmol) of 4,4'-dihydroxydiphenyl, 5.75 g (25 mmol) of 4-hydroxybenzoic acid-4'-hydroxyphenylester and 7 g (52 mmol) of anhydrous $K_2CO_3$ are introduced together with 100 ml of NMP and 50 ml of toluene into a three-necked flask equipped with stirrer, internal thermometer and water separator and heated to a temperature of 150-153° C. for 5.5 hours. During this time, the water is removed azeotropically. The reaction temperature is continuously increased to 176° C. and this temperature is maintained for 6 hours. The solution is filtered after cooling to room temperature. 5 Ml of acetic acid are then added and the polymer is precipitated in 2 l of methanol, isolated and stirred in boiling water for one hour. The product is obtained by filtration and dried in a vacuum:
Molecular weight (GPC): Mw=22,300
IR: 1735 cm$^{-1}$
Tg (DSC): 213° C.

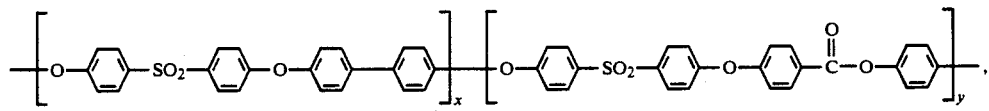

In the above formula, x and y depend on the quantities of starting compounds used.

EXAMPLE 3

Polyether 5

21.82 g (100 mmol) of 4,4'-difluorobenzophenone, 9.31 g (50 mmol) of 4,4'-dihydroxydiphenyl, 11.5 g (50 mmol) of 4-hydroxybenzoic acid -4'-hydroxyphenylester and 14 g (145 mmol) of anhydrous K$_2$CO$_3$ are introduced into a three-necked flask equipped with stirrer and internal thermometer together with 200 ml of NMP and 100 ml of toluene and heated to a temperature of 150–153° C. for 4 hours. Azeotropic removal of water takes place during this time. The reaction temperature is continuously raised and maintained at 180° C. for 8 hours. After cooling to room temperature, the solution is filtered, 5 ml of acetic acid are added and the polymer is precipitated in 2 l of methanol, isolated, and stirred in boiling water for one hour. The product is obtained by filtration and dried in a vacuum.

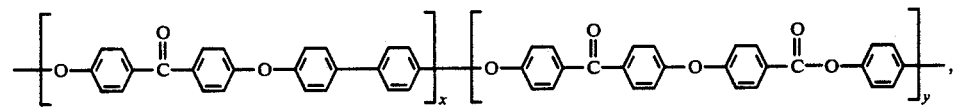

In the above formula, x and y depend on the quantity of starting compounds used.

EXAMPLE 4

Preparation of the block cocondensates according to the invention:

The following starting materials required for the preparation of the LC polymer blocks:
p-Hydroxybenzoic acid,
hydroquinone,
4,4-dihydroxydiphenyl,
terephthalic acid,
isophthalic acid,
acetic anhydride and
magnesium acetate (anhydrous)
and one of the polyethers, 1, 2 or 3 were weighed in the proportions shown in Table 1 into a 1-l ground glass vessel equipped with ground glass lid, stirrer, nitrogen inlet and a distillation attachment connected to a condenser, and the mixture was subjected to a process of solvent-free condensation known to the person skilled in the art (e.g. European Patent Specification 0 165 399).

Block copolymers of liquid crystalline polyester and aromatic polyether blocks formed under the reaction conditions.

TABLE 1

|  | 1 | 2 | 3 | 4 | 5 |
|---|---|---|---|---|---|
| p-Hydroxybenzoic acid (g) | 207 | 103.5 | 310.5 | 207 | 103.5 |
| 4,4'-Dihydroxydiphenyl (g) | 93 | 46.5 | 139.7 | 93 | 46.5 |
| Terephthalic acid (g) | 49.8 | 24.9 | 74.7 | 49.8 | 24.9 |
| Isophthalic acid (g) | 32.8 | 16.6 | 49.8 | 32.8 | 16.6 |
| Acetic anhydride (g) | 260.1 | 130.1 | 390 | 260.1 | 130.1 |
| Magnesium acetate (g) | 0.03 | 0.02 | 0.04 | 0.03 | 0.02 |
| Polyether 1 (g) | 84.3 | 168.6 | — | — | — |
| Polyether 2 (g) | — | — | 100.3 | — | — |
| Polyether 3 (g) | — | — | — | 84.3 | 168.6 |
| ηrel (solution viscosity | Samples were insoluble in all solvents suitable for LCP. | | | | |
| Fusion viscosity (T = 330° C.; L/D = 30:1 = 1000 s−1) | 5 | 12 | 12 | 5 | 10 |
| Tg (°C.) | 156 | 155 | 150 | 153 | 155 |
| ΔH (J/g) (Melting enthalpy) | 1.6 | 3.4 | 1.4 | 2.6 | 1.5 |
| Tm (°C.) (Melting point) | 326 | 333 | 327 | 329 | 320 |

We claim:
1. New aromatic polyethers containing ester groups corresponding to the following formula

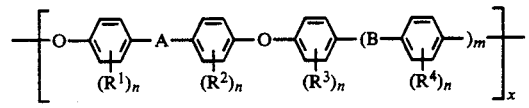

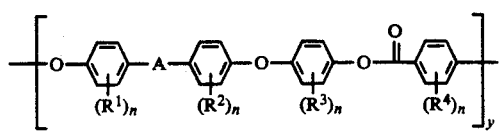

wherein
R$^1$ to R$^4$ are identical or different and stand for halogen, hydrogen, C$_1$–C$_4$-alkyl, C$_6$–C$_{12}$-aryl or C$_7$–C$_{12}$-aralkyl,
A stands for SO$_2$, CO, SO or

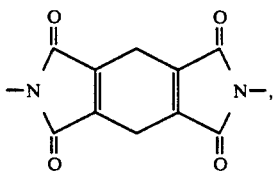

B denotes a chemical bond, CO, O, S, SO$_2$,

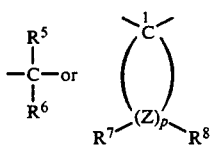

wherein

R$^5$ and R$^6$ are identical or different and stand for halogen, hydrogen, C$_1$-C$_4$-alkyl or C$_5$-C$_{12}$cycloalkyl optionally having one or more alkyl substituents, p is an integer, from 4 to 7, R$^7$ and R$^8$ are chosen individually for each Z and denote, independently of one another, hydrogen or C$_1$-C$_6$-alkyl, and Z denotes carbon, under the condition that on at least one Z atom, the groups R$^7$ and R$^8$ are both alkyl, n denotes 0 or an integer from 1 to 4, m denotes 0 or an integer from 1 to 3, and x and y are in proportions from 99.5 : 0.5 parts by weight to 50 : 50 parts by weight per total quantity of polymer.

2. Process for the preparation of aromatic polyethers containing ester groups corresponding to the following formula

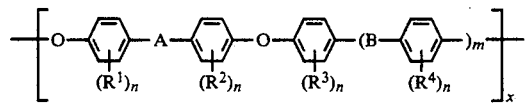

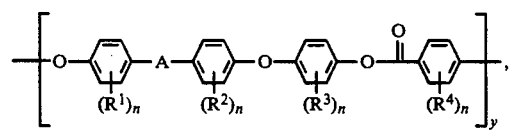

wherein

R$^1$ to R$^4$ are identical or different and stand for halogen, hydrogen, C$_1$-C$_4$-alkyl, C$_6$-C$_{12}$-aryl or C$_7$-C$_{12}$-aralkyl, A stands for SO$_2$, CO, SO or

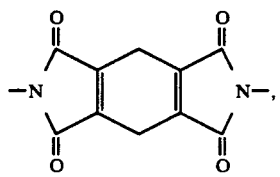

B denotes a chemical bond, CO, O, S, SO$_2$,

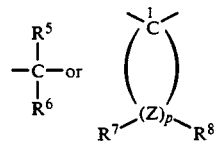

wherein

R$^5$ and R$^6$ are identical or different and stand for halogen, hydrogen, C$_1$-C$_4$-alkyl or C$_5$-C$_{12}$-cycloalkyl optionally having one or more alkyl substituents, p is an integer from 4 to 7, R$^7$ and R$^8$ are selected individually for each Z and denote, independently of one another, hydrogen or C$_1$-C$_6$-alkyl, and Z denotes carbon under the condition that on at least one Z atom, the groups R$^7$ R$^8$ are both alkyl, n denotes 0 or an integer from 1 to 4, m denotes 0 or an integer from 1 to 3 and x and y are in the ratio of from 99.5 : 0.5 parts by weight to 50 : 50 parts by weight per total quantity of polymer, wherein said process comprises reacting aromatic dihalides corresponding to the following formula

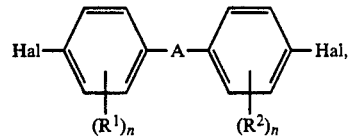

wherein R$^1$, R$^2$, A and n have the meanings indicated above and Hal stands for fluorine, chlorine or bromine, with aromatic bisphenols corresponding to the following general formula

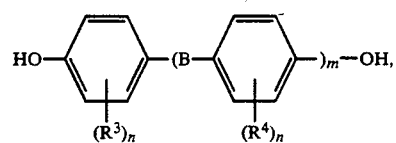

wherein R$^3$, R$^4$, B, m and n have the meanings indicated above and with aromatic ester bisphenols corresponding to the following general formula

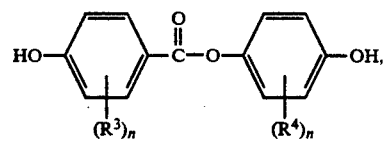

wherein R$^3$, R$^4$ and n have the meanings indicated above, for about 1–50 hours at temperatures of from about 130 to 320° C. and at pressures of from about 0.8 to 10 bar, in a condensation reaction in the presence of from 1 to 1.3 equivalents of basic catalysts based on dihydroxy compounds and in the presence of from 0.5 to 50 parts by weight, based on the total weight of the aromatic dihalides, aromatic bisphenols and aromatic ester bisphenols, of dipolar, aprotic solvents corresponding to the following formulae:

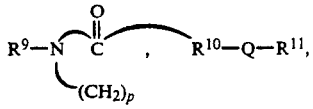

wherein
$R^9$, $R^{10}$ and $R^{11}$ are identical or different and stand for $C_1$–$C_{20}$-alkyl, $C_5$–$C_7$-cycloalkyl or $C_6$–$C_{20}$-aryl,
Q denotes a sulphoxide or sulphone group and
p stands for the number 3, 4 or 5,
the bisphenols being used in proportions to one another of from 99.5 : 0.5 parts by weight to 50 : 50 parts by weight.

3. Aromatic polyethers containing ester groups according to claim 1 wherein A stands for CO or SO.

4. A process according to claim 2 wherein A stands for CO or SO.

5. Block copolymers formed by reaction of the aromatic polyethers containing ester groups according to claim 1 with polyesters, polycarbonates, polyamides and polyester amides.

6. Block copolymers of claim 5, comprising aromatic polyether segments and liquid crystalline polyester segments.

7. The process of claim 2, wherein said aromatic dihalides comprise at least one compound selected from the group consisting of 4,4'-dichlorodiphenylsulphone, 4,4'-difluorodiphenylsulphone, 4,4'-difluorobenzophenone and 4,4'-dichlorobenzophenone.

8. The process of claim 2, wherein said aromatic bisphenols comprise at least one compound selected from the group consisting of hydroquinone, methylhydroquinone, phenylhydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, $\alpha,\alpha'$-bis-(hydroxyphenyl)-diisopropylbenzenes and corresponding compounds which are alkylated or halogenated in the nucleus.

9. The process of claim 2, wherein said dipolar, aprotic solvents comprise at least one compound selected from the group consisting of N-methylpyrrolidone, N-methylcaprolactam, dimethylsulphoxide, diphenylsulphone and sulpholan.

10. The process of claim 2, wherein said basic catalysts comprise at least one compound selected from the group consisting of alkali metal salts and alkaline earth metal salts.

11. The process of claim 10, wherein said alkali metal salts and alkaline earth metal salts comprise sodium hydroxide, potassium hydroxide, sodium methanolate, potassium carbonate and potassium bicarbonate.

12. The aromatic polyethers containing ester groups of claim 1, further comprising at least one additive selected from the group consisting of plasticizers, mould release agents, stabilizers, UV absorbents, antioxidants, flame-protective agents, reinforcing fibres, fillers, inorganic and organic pigments, ceramic raw materials and carbon black.

* * * * *

UNITED STATES PATENT AND TRADEMARK OFFICE
CERTIFICATE OF CORRECTION

PATENT NO. : 5,221,727
DATED : June 22, 1993
INVENTOR(S) : Kumpf et al

It is certified that error appears in the above-identified patent and that said Letters Patent is hereby corrected as shown below:

Column 20, claim 2, line 20, "$R^7R^8$" should be -- $R^7$ and $R^8$ --.

Column 21, claim 2, lines 1-5, should be

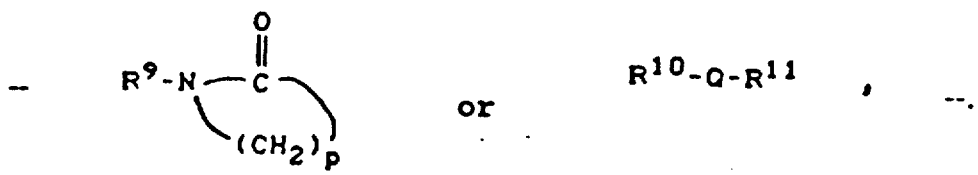

Signed and Sealed this

Fifteenth Day of March, 1994

Attest:

BRUCE LEHMAN

Attesting Officer  Commissioner of Patents and Trademarks